United States Patent
Cox et al.

(10) Patent No.: US 10,387,553 B2
(45) Date of Patent: Aug. 20, 2019

(54) DETERMINING AND ASSISTING WITH DOCUMENT OR DESIGN CODE COMPLETENESS

(71) Applicant: International Business Machines Corporation, Armonk, NY (US)

(72) Inventors: Susan M. Cox, Rochester, MN (US); Janani Janakiraman, Austin, TX (US); Nadiya Kochura, Bolton, MA (US); Fang Lu, Billerica, MA (US); Daniel Ramirez, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 275 days.

(21) Appl. No.: 15/341,698

(22) Filed: Nov. 2, 2016

(65) Prior Publication Data
US 2018/0121404 A1    May 3, 2018

(51) Int. Cl.
*G06F 17/00* (2019.01)
*G06F 17/24* (2006.01)
*G06F 17/27* (2006.01)

(52) U.S. Cl.
CPC .......... *G06F 17/24* (2013.01); *G06F 17/2765* (2013.01); *G06F 17/2785* (2013.01)

(58) Field of Classification Search
CPC .............................................. G06F 17/30011
See application file for complete search history.

(56) References Cited

U.S. PATENT DOCUMENTS

| | | | |
|---|---|---|---|
| 7,689,409 | B2 | 3/2010 | Heinecke |
| 7,752,204 | B2 | 7/2010 | Kao et al. |
| 8,930,399 | B1 | 1/2015 | Das et al. |
| 9,129,240 | B2 | 9/2015 | Holler et al. |

(Continued)

FOREIGN PATENT DOCUMENTS

| | | |
|---|---|---|
| EP | 1620830 A2 | 2/2006 |
| WO | 1994016397 A2 | 7/1994 |

OTHER PUBLICATIONS

Glance et al., "Collaborative Document Monitoring," GROUP '01, copyright 2001 ACM, p. 171-178. (Year: 2001).*

(Continued)

*Primary Examiner* — Amelia L Tapp
(74) *Attorney, Agent, or Firm* — Cantor Colburn LLP; Noah Sharkan

(57) ABSTRACT

A tool is provided for document or design code completion. The tool includes a storage element in which common and user-specific unfinished work indicators are stored in first and second databases, respectively, a search element and a processor. The search element is disposed to identify unfinished work in documents by searching for matches of first text within the documents with second text of the common and user-specific work indicators in the first and second databases. The processor is configured to create a third database including the second text and pertinent sections of the documents. The pertinent sections are respectively associated with the second text and verifiably marked as unfinished by natural language processing of the first and second text by the processor. The processor is further configured to update the first and second databases based on results of the natural language processing.

18 Claims, 4 Drawing Sheets

(56) References Cited

U.S. PATENT DOCUMENTS

| | | |
|---|---|---|
| 9,251,484 B2 | 2/2016 | Cantor et al. |
| 2003/0033288 A1* | 2/2003 | Shanahan ............ G06F 17/3064 |
| 2006/0059028 A1* | 3/2006 | Eder ................. G06F 17/30864 |
| | | 705/7.12 |
| 2008/0313017 A1 | 12/2008 | Totten |
| 2013/0054509 A1* | 2/2013 | Kass ....................... G06Q 10/00 |
| | | 706/55 |
| 2015/0379887 A1* | 12/2015 | Becker ................. G06Q 10/101 |
| | | 715/229 |

OTHER PUBLICATIONS

Shafiq et al., Handling incomplete data using semantic logging based social network analysis hexagon for effective application monitoring and management, (ASONAM), 2014 IEEE/ACM International Conference on, 2014, 8 pages.

\* cited by examiner

DETERMINING AND ASSISTING WITH DOCUMENT OR DESIGN CODE COMPLETENESS

BACKGROUND

The present invention relates to document or design code and, more specifically, to a tool for determining and assisting with document or design code completeness.

Collaborative software or groupware is application software that is designed to help people involved in a common task to achieve their goals. One of the earliest definitions of collaborative software is "intentional group processes plus software to support them." Collaborative software overlaps considerably with computer-supported cooperative work (CSCW) and addresses how collaborative activities and their coordination can be supported by computer systems.

The use of collaborative software in workspaces creates collaborative working environment (CWE) collaborative work systems. Collaborative work systems are generally conceived as any form of human organization that emerges anytime collaboration takes place, whether it is formal or informal, intentional or unintentional. Whereas groupware or collaborative software pertains to technological elements of computer-supported cooperative work, collaborative work systems are analytical tools to understand the behavioral and organizational variables that are associated with CSCW.

SUMMARY

According to an embodiment of the present invention, a tool is provided for document or design code completion. The tool includes a storage element in which common and user-specific unfinished work indicators are stored in first and second databases, respectively, a search element and a processor. The search element is disposed to identify unfinished work in documents by searching for matches of first text within the documents with second text of the common and user-specific work indicators in the first and second databases. The processor is configured to create a third database including the second text and pertinent sections of the documents. The pertinent sections are respectively associated with the second text and verifiably marked as unfinished by natural language processing of the first and second text by the processor. The processor is further configured to update the first and second databases based on results of the natural language processing.

According to another embodiment of the present invention, a method of operating a tool for document or design code completion is provided. The method includes storing common and user-specific unfinished work indicators in first and second databases, respectively, identifying unfinished work in documents by searching for matches of first text within the documents with second text of the common and user-specific work indicators in the first and second databases and creating a third database including the second text and pertinent sections of the documents. The creating includes executing natural language processing of the first and second text to respectively associate the pertinent sections with the second text and to verifiably mark the pertinent sections as unfinished. The method further includes updating the first and second databases based on results of the natural language processing.

According to yet another embodiment of the present invention, a computer program product is provided for operating a tool for document or design code completion. The computer program product includes a processor and a storage element having executable instructions stored thereon, which, when executed, cause the processor to execute a method. The method includes storing common and user-specific unfinished work indicators in first and second databases, respectively, identifying unfinished work in documents by searching for matches of first text within the documents with second text of the common and user-specific work indicators in the first and second databases and creating a third database including the second text and pertinent sections of the documents. The creating includes executing natural language processing of the first and second text to respectively associate the pertinent sections with the second text and to verifiably mark the pertinent sections as unfinished. The method further includes updating the first and second databases based on results of the natural language processing.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
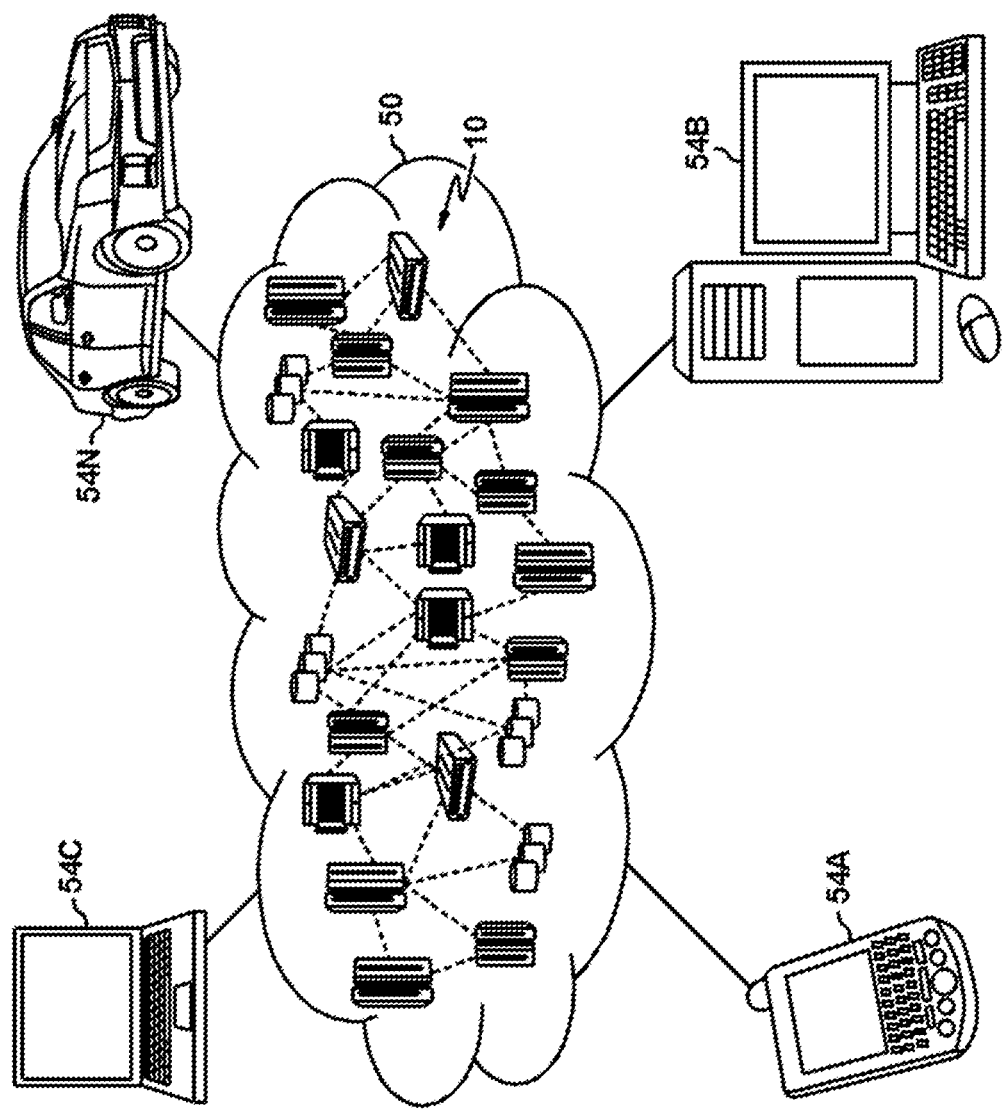
FIG. 1 depicts a cloud computing environment according to an embodiment of the present invention.

A source code designer might be rushing to meet deadlines on some source code or a key business document but eventually comes to a section that cannot be finished right away. The designer therefore adds a phrase to his document (e.g., TBD or TODO) or perhaps uses bold italic red coloring in his text as an alert to return to that portion he still needs to complete. He then continues with other work on the document. For such cases and for other similar situations involving one or more individuals, a tool is provided to find snippets of unfinished design code or passages in a piece of designed source code or in a business document. The tool can be used by one or more individuals or by a team and may be especially helpful the day arrives when the snippets of unfinished design code or passages need to be completed. The tool looks for natural language cues to generate a completeness report that can be displayed in a graphical user interface (GUI), for example, to facilitate the identification of stray unfinished items for a given source code or business document.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines and services) that can be rapidly provisioned and released with minimal management effort or interaction with a provider of the service. This cloud model may include at least five characteristics, at least three service models, and at least four deployment models.

Characteristics of cloud computing environments are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth and active user accounts). Resource usage can be monitored, controlled and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks and other fundamental computing resources where the consumer is able to deploy and run arbitrary software, which can include operating systems and applications. The consumer does not manage or control the underlying cloud infrastructure but has control over operating systems, storage, deployed applications and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity and semantic interoperability. At the heart of cloud computing is an infrastructure including a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistants (PDAs) or cellular telephones 54A, desktop computers 54B, laptop computers 54C and/or automobile computer systems 54N may communicate. Nodes 10 may communicate with one another. They may be grouped (not shown) physically or virtually, in one or more networks, such as Private, Community, Public or Hybrid clouds as described hereinabove, or in a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
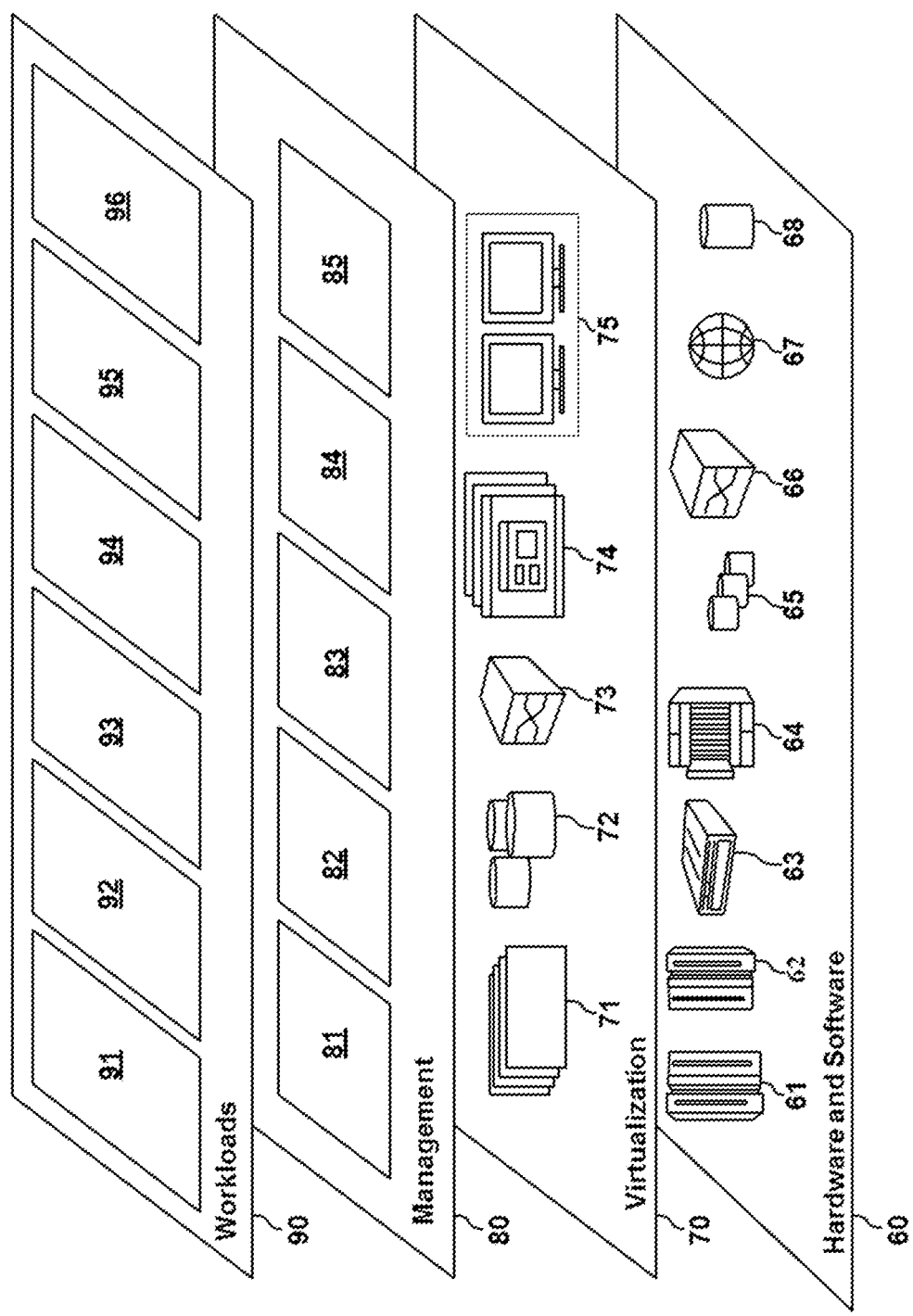
FIG. 2 depicts abstraction model layers according to an embodiment of the present invention.

Referring now to FIG. 2, a set of functional layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include, but are not limited to, mainframes 61, reduced instruction set computer (RISC) architecture based servers 62, servers 63, blade servers 64, storage devices 65 and networks and networking components 66. In some embodiments, software components include network application server software 67 and database software 68.

Virtualization layer 70 provides a layer from which the following examples of virtual entities may be provided: virtual servers 71, virtual storage 72, virtual networks 73, including virtual private networks, virtual applications and operating systems 74 and virtual clients 75.

In one example, management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service level agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include, but are not limited to: mapping and navigation 91, software development and lifecycle management 92, virtual classroom education delivery 93, data analytics processing 94, transaction processing 95 and tool 96. The tool 96 takes common and user/team specific indicators of unfinished work (e.g., TBD, TODO, . . . , wip, bold red italics, document section headers with no body, etc.), searches a user set of documents (business documents, design source code) to find matches, identifies pertinent nearby sections or passages while disregarding finished sections that use these indicators on purpose (not to indicate incompleteness), adds an owner to the remaining items when possible and presents the results to the user/team. The user/team can correct the results, if needed, or add missed items. The user/team modifications are fed back into the tool 96 for learning processes. The results can be used in applications, such as applications that automatically generate status reports for a set of documents and applications that help users and teams to efficiently discover unfinished work so they can complete it to the needed completeness level.

Figure 3:
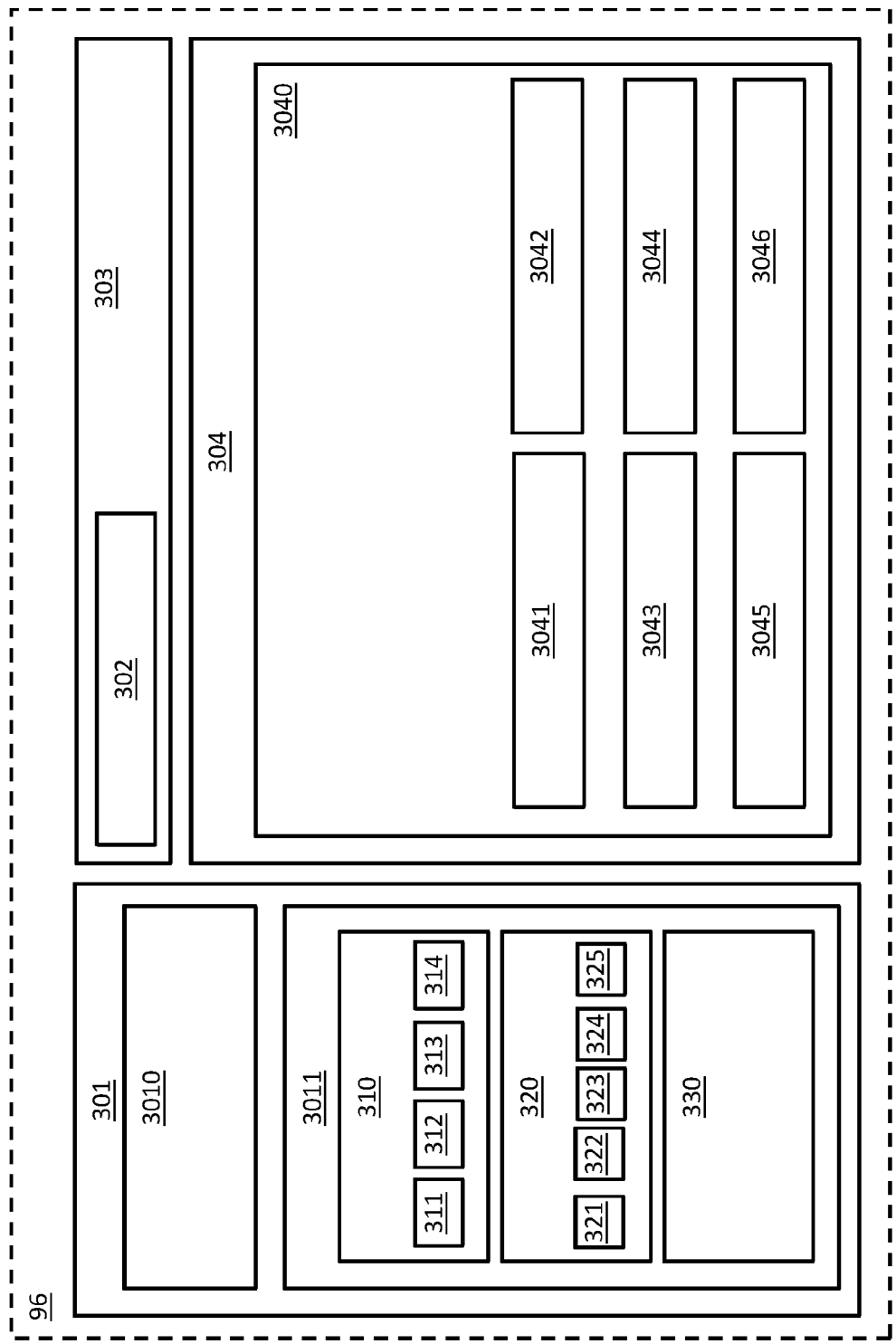
FIG. 3 is a schematic illustration of a tool provided for document or design code completion in accordance with embodiments.

With reference to FIG. 3, the tool 96 is provided for document or design code completion and includes a storage element 301, a search element 302 and a processor 303. The storage element 301 may be provided with any type of read-only memory (ROM) storage units 3010 and any type of random access memory (RAM) storage units 3011. The ROM storage units 3010 may include executable instructions, which, when executed, cause the processor 303 to perform the methods and algorithms described herein. The RAM storage units 3011 include a first database 310, a second database 320 and a third database 330. The first database 310 includes common unfinished work indicators and the second database 320 includes user-specific unfinished work indicators.

English examples of common unfinished work indicators that would be stored in the first database 310 include, but are not limited to, acronyms 311 like "to be determined" or "TBD", "to be confirmed" or "TBC", "to be announced" or "TBA", "et cetera" or "etc." and "work in progress" or "wip" and phrases 312 such as "to do" or "TODO", " . . . " or "ellipsis", "and so forth" or "and other things." The first database 310 can include any or all of these, additional examples and multilingual or multi-cultural versions thereof. The first database 310 may also include section headers without section bodies (i.e. empty sections) 313 and descriptions thereof whereby section headers are described as being identifiable by font size, numbering being present, capitalization, isolated incomplete sentences (e.g., 2.0 Now This) or separators 314 like isolated underlined phrases, blank lines or lines with unusual punctuation in passages (e.g., "===============" or "////////////////////////").

The second database 320 may include a listing of user or team specific indicators of unfinished work. The user-specific unfinished work indicators can include user-added indicators, updateable collections of previously-used indicators and a measure of a finished appearance of a document. That is, the user/team-specific indicators of unfinished work may include, but are not limited to, user/team added and easily searched terms 321 and indicators from previously unfinished documents 322. As will be described below, the second database 320 may be updateable such that the tool 96 learns which of the user/team-specific indicators of unfinished work 321 are most commonly employed by the user/team and which user/team-specific indicators of unfinished work are newly incorporated into the user/team lexicon. The second database 320 may also include a model of what "completed" documents look like either in a graphical or textual sense. That is, the second database 320 may include images of completed documents 323 and/or descriptions of completed documents (e.g., well-formatted, properly formatted, readable, lack of spelling mistakes, etc.). Additionally or alternatively, the second database 320 may include inverse of definitions of "completed work" such as images of incomplete documents 324 and/or descriptions thereof 325.

The search element 302 is disposed to identify unfinished work in documents by searching for matches between first text from within those documents and second text from any of the listings within either of the first database 310 or the second database 320. Those matches are thereafter regarded as candidates of unfinished work by the tool 96 and respectively include the first text, the second text and a selection of the text surrounding the either the first text or the second text from within the documents (i.e., the surrounding text). Thus, if the first text is "TODO" and a phrase next to the "TODO" marking says, "must add more words about stock prices," the search element 302 will search for words and phrases associated with stocks or stock prices to find the second text. Alternatively, if the second database 320 indicates that unfinished work is characterized by a lack of completeness or formatting, the second database 320 will look for those documents or sections thereof that are incomplete or unformatted.

The matches that are regarded as candidates of unfinished work by the tool 96 are stored in the third database 330. Thus, each listing in the third database 330 will include each first text incident, each second text incident and each surrounding text incident for each of the identified matches. Each listing in the third database 330 may also include a name or identification of the user or team that can be found intermixed with the second text incident or which is most closely associated with each second text incident.

In accordance with embodiments, the search element 302 will employ natural language processing to complete the search and the processor 303 will employ similar natural language processing to process the results. In detail, at an initial stage, the processor 303 will apply the natural language processing to the candidates of unfinished work in the third database 330 to identify and determine those cases where the user adding in the unfinished work indicator did not or is not actually intending to mark the work as unfinished. In such cases, the processor 303 will remove or mark invalid the corresponding section from or in the third database 330. That is, the processor 303 will use the natural language processing to determine whether, in each candidate of unfinished work, the unfinished work indicator actually makes sense relative to the common language of the document as a whole. This can be done, for example, by learning from previous cases to identify candidates of unfinished work that are similar to previous candidates but which were at the time found to be selections of actual complete documents. As an example, if a section of a document is written in red font, the processor 303 may initially regard the red font as an indicator of unfinished work but then determine that the only other time the corresponding user used such red ink occurred in a case of a complete document, the processor 303 may eventually determine that this is an unlikely candidate of unfinished work. Alternatively, the processor 303 may generate a statistical analysis from previously completed design code or documents to learn what is "normal" for particular users or teams (perhaps one author uses "etc." frequently in finished work). Them, either a maximum number (threshold) can be used to indicate incompleteness (there are more than eight cases of 'etc.' used in this 2 page document), or a statistical maximum can be used ('etc.' is used in more than 4% of the sentences/phrases in this 2 page document). These numbers or thresholds can then be aggregated across whole teams or provided such that each team member has an individual score. Candidates of finished work in the third database 330 can, at this point, be removed or marked invalid accordingly.

With continued reference to FIG. 3, the tool 96 may also include a display unit 304 by which results of the above-described processing and analysis can be presented to the user/team. That can include simply displaying the third database 330 through or within a visual tool or a graphical user interface (GUI) 3040. In the latter case, the GUI 3040 may be made with a focus on helping the user or team to complete work to the level desired (e.g., making it interactive, easily navigating to the file/section of document or code, updating easily once the section is done) and may include an "ignore" feature 3041 for unfinished work that, in the judgement of the user/team, never needs to get completed, a real/false marking feature 3042 to allow the user/team to mark each item as either a real unfinished item or a false unfinished item (e.g., a complete item), a correct/incorrect marking feature 3043 to allow the user/team to mark each item's pertinent section as either correctly identified or incorrectly identified, a passage update feature 3044 to allow the user/team to update the tool 96 with the correct passage, an add/modify feature 3045 to allow the user/team to add or modify the listed owner or user of each entry, a manual add feature 3046 to allow the user/team to manually add additional unfinished work sections or passages to the tool 96.

Figure 4:
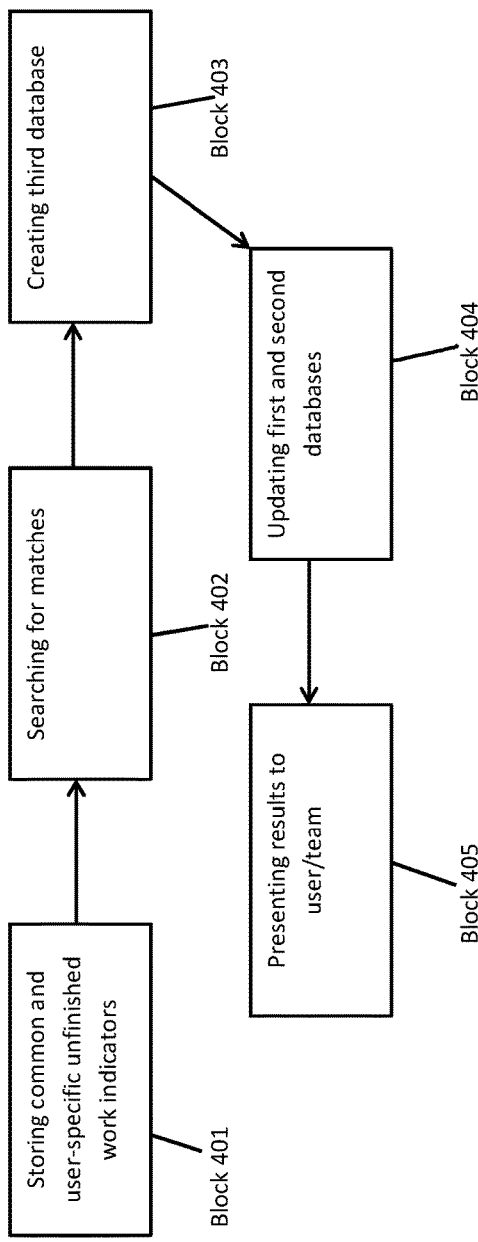
FIG. 4 is a flow diagram illustrating a method of operating a tool for document or design code completion in accordance with embodiments.

With reference to FIG. 4, a method of operating the tool 96 for document or design code completion is provided. As shown in FIG. 4, the method initially includes storing common and user-specific unfinished work indicators in the first and second databases 310 and 320, respectively (block 401). The method then includes identifying unfinished work in one or more types of documents by searching for matches of the first text within the documents with the second text of the common and user-specific work indicators in the first and second databases 310 and 320 (block 402). In an event that matches are found, the method also includes creating a third database 330 that includes the second text and pertinent sections of the documents (block 403). As described above, such creating includes an execution of natural language processing of the first and second text and to respectively associate the pertinent sections with the second text and to verifiably mark the pertinent sections as being unfinished. Once the creating of the third database 330 is complete, the first and second databases are updated if necessary (block 404) and results are presented to a user/team (block 405).

Figure 5:
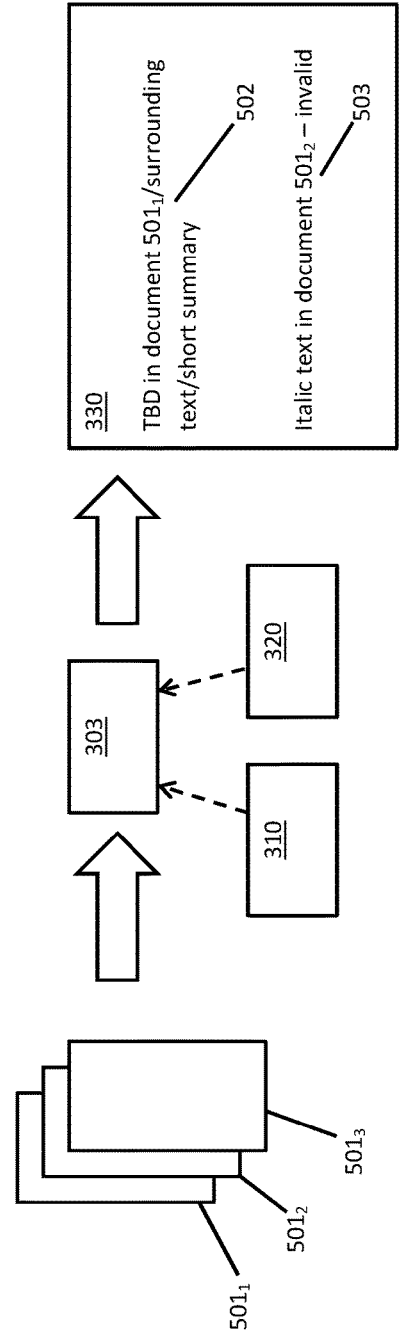
FIG. 5 is a flow diagram illustrating an exemplary instance of an execution of the tool in accordance with embodiments.

With reference to FIG. 5, an exemplary operation of the tool 96 will now be described. The exemplary operation begins with the first and second databases 310 and 320 already having been initiated and established and with a set of documents 501 to be analyzed being received as inputs by the processor 303. Once the documents 501 are received, the processor 303 searches through the documents for potential matches of document text with either the first text or the second text. As a result of that search, the processor 303 identifies the instance of the phrase "TBD" in first document $501_1$ and a section of italic text in document $501_2$, which the processor 303 matches with unfinished work indicator "TBD—To Be Determined" in the first database 310 and with the description of italic text in the second database 320.

The processor 303 then executes natural language processing on the "TBD" instance in the first document which indicates from text surrounding the "TBD" instance that the item to be determined is a result of an experiment the team authoring the first document $501_1$ is running. The processor 303 subsequently creates the third database 330 to include the "TBD" instance, the surrounding text from the first document $501_1$ and a short summary reminder in a first document listing 502. This short summary reminder serves to inform the authoring team to include experimental results in the first document $501_1$. At a same time, the processor 303 executes natural language processing on the italic text instance in the second document $501_2$. In this case, the natural language processing indicates from text surrounding the italic text instance that the italics are provided as part of a long quote and are properly formatted in italics. Thus, while the processor 303 creates the third database 330 to include the first document listing 502, the processor 303 either omits the italic text from another listing or includes the italic text in a new listing 503 that is marked as invalid.

Once the third database 330 is fully populated, the third database 330 is presented to the user/team via the GUI 3040.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A tool for document or design code completion, comprising:
   a storage element in which common and user-specific unfinished work indicators are stored in first and second databases, respectively;
   a search element disposed to identify unfinished work in documents by searching for matches of first text within the documents with second text of the common and user-specific work indicators in the first and second databases; and
   a processor configured to create a third database comprising the second text and pertinent sections of the documents,
   the pertinent sections being respectively associated with the second text and verifiably marked as unfinished by natural language processing of the first and second text by the processor, and the processor being further configured to update the first and second databases based on results of the natural language processing, wherein the common unfinished work indicators comprise multilingual or multi-cultural acronyms and phrases, empty sections and separators, and wherein the user-specific unfinished work indicators comprise user-added indicators, updateable collections of previously-used indicators and a measure of a finished appearance of a document.

2. The tool according to claim 1, wherein the search element initially searches for candidates of unfinished work.

3. The tool according to claim 2, wherein the candidates of unfinished work comprise a captured common or user-specific unfinished work indicator and at least a surrounding phrase.

4. The tool according to claim 1, wherein the pertinent sections are at least one of textually related to the second text and proximate to the second text.

5. The tool according to claim 1, wherein the pertinent sections are verifiably marked as unfinished in an event the natural language processing dictates user intent to input an unfinished marking.

6. The tool according to claim 5, wherein the natural language processing analyses common document language, previous documents, and statistical analysis.

7. The tool according to claim 1, wherein the third database further comprises an identification of a user associated with the second text.

8. The tool according to claim 1, further comprising a display unit to display information of the third database to a user.

9. The tool according to claim 8, wherein the display unit displays the information in an interactive, navigable graphical user interface (GUI).

10. A computer-implemented method of operating a tool for document or design code completion, the method comprising:

storing common and user-specific unfinished work indicators in first and second databases, respectively;

identifying unfinished work in documents by searching for matches of first text within the documents with second text of the common and user-specific work indicators in the first and second databases;

creating a third database comprising the second text and pertinent sections of the documents, wherein the creating comprises executing natural language processing of the first and second text to respectively associate the pertinent sections with the second text and to verifiably mark the pertinent sections as unfinished; and updating the first and second databases based on results of the natural language processing, wherein the common unfinished work indicators comprise multi-lingual acronyms and phrases, empty sections and separators, and wherein the user-specific unfinished work indicators comprise user-added indicators, updateable collections of previously-used indicators and a measure of a finished appearance of a document.

11. The method according to claim 10, wherein the identifying of the unfinished work comprises initially searching for candidates of unfinished work.

12. The method according to claim 11, wherein the candidates of unfinished work comprise a captured common or user-specific unfinished work indicator and at least a surrounding phrase.

13. The method according to claim 10, wherein the pertinent sections are at least one of textually related to the second text and proximate to the second text.

14. The method according to claim 10, wherein the pertinent sections are verifiably marked as unfinished in an event the natural language processing dictates user intent to input an unfinished marking.

15. The method according to claim 14, wherein the natural language processing comprises analyzing common document language, previous documents, and statistical analysis.

16. The method according to claim 10, wherein the creating of the third database comprises identifying a user associated with the second text.

17. The method according to claim 10, further comprising displaying information of the third database to a user in an interactive, navigable graphical user interface (GUI).

18. A computer program product for operating a tool for document or design code completion, the computer program product comprising:

a processor; and a storage element having executable instructions stored thereon, which, when executed, cause the processor to execute a method comprising:

storing common and user-specific unfinished work indicators in first and second databases, respectively;

identifying unfinished work in documents by searching for matches of first text within the documents with second text of the common and user-specific work indicators in the first and second databases;

creating a third database comprising the second text and pertinent sections of the documents, wherein the creating comprises executing natural language processing of the first and second text to respectively associate the pertinent sections with the second text and to verifiably mark the pertinent sections as unfinished; and updating the first and second databases based on results of the natural language processing, wherein the common unfinished work indicators comprise multi-lingual acronyms and phrases, empty sections and separators, and wherein the user-specific unfinished work indicators comprise user-added indicators, updateable collections of previously-used indicators and a measure of a finished appearance of a document.

\* \* \* \* \*